United States Patent
Motohashi et al.

(10) Patent No.: US 6,381,399 B1
(45) Date of Patent: Apr. 30, 2002

(54) IMAGE INFORMATION REPRODUCING APPARATUS

(75) Inventors: Hiroyuki Motohashi; Nobuo Matsue; Shoichi Katagiri; Shigeru Watanabe; Hirohide Kobori; Naoto Arifuku; Futoshi Tachibana; Masakazu Furukawa; Kazuhiko Umehara; Ryo Takeuchi; Kazuhiko Moriya; Satoru Joraku, all of Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/225,829

(22) Filed: Jan. 6, 1999

(30) Foreign Application Priority Data

Jan. 30, 1998 (JP) ............................................ 10-019627

(51) Int. Cl.$^7$ ................................................. H04N 5/93
(52) U.S. Cl. ............................ 386/55; 386/52; 345/723
(58) Field of Search .............................. 386/52, 55, 68, 386/53, 65; 345/700, 703, 704, 723; H04N 5/93

(56) References Cited

U.S. PATENT DOCUMENTS

| | | | | |
|---|---|---|---|---|
| 5,388,197 A | * | 2/1995 | Rayner | 386/54 |
| 5,568,275 A | * | 10/1996 | Norton et al. | 386/52 |
| 5,687,160 A | * | 11/1997 | Aotake et al. | 386/126 |
| 5,826,102 A | * | 10/1998 | Escobar et al. | 345/835 |

* cited by examiner

Primary Examiner—Vincent F. Boccio
(74) Attorney, Agent, or Firm—Morgan, Lewis & Bockius LLP

(57) ABSTRACT

An image information reproducing apparatus generates a video signal carrying an original image from a read signal acquired from an image information recording medium, prepares a manually-input image to be superimposed on the original image in accordance with an operational input, thereby generating a manually-input image signal, generates a mixed image signal carrying a mixed image having the manually-input image superimposed on the original image, based on the video signal and the manually-input image signal, and stores the manually-input image signal in association with address information in the recording medium of a video signal corresponding to the original image on which the manually-input image is superimposed.

15 Claims, 6 Drawing Sheets

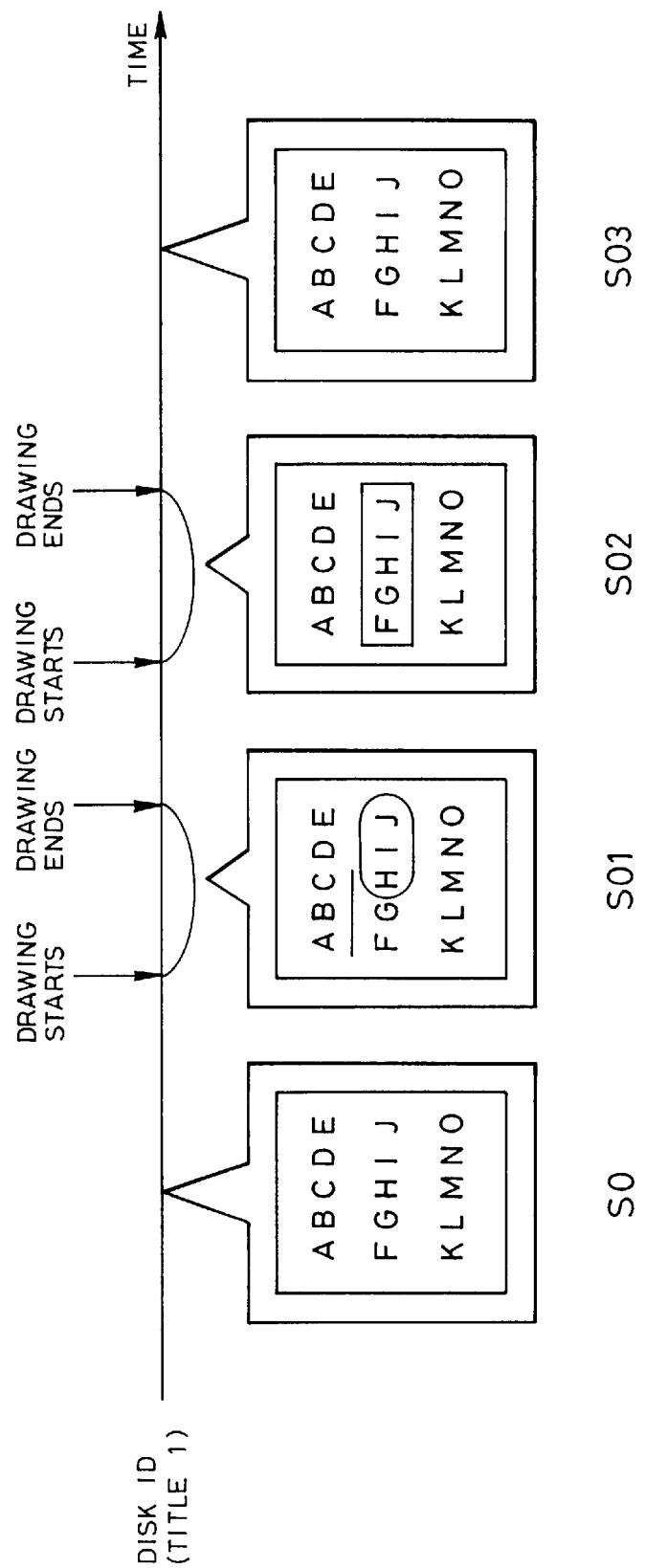

FIG. 4

| DISK ID | DRAWER ID | ADDRESS | | DISPLAY CONTROL MAIN INFORMATION | DISPLAY CONTROL SUB-INFORMATION | PAUSE INFORMATION | MANUALLY-INPUT IMAGE INFORMATION | FILLING INSIDE RECTANGULAR FRAME |
|---|---|---|---|---|---|---|---|---|
| | | START POINT | END POINT | | | | | |
| A (LANGUAGE I) | a | 0 | 20 | 1 | | 1 | (TRIANGLE) | 1 |
| | | | | | | 0 | (RECTANGLE) | |
| | | | | | | 1 | (UNDERLINE) | |
| | | 35 | 55 | | | 1 | ( •) | 0 |
| | | | | | | 1 | (FREE-FORM CURVE) | |
| | | 900 | 950 | | | 0 | (ARROW) | 1 |
| | x | 850 | 950 | 0 | | 0 | (ELLIPSOID) | 1 |
| | | | | | | 1 | ( •) | |
| | | | | | | 0 | (MARK x) | |
| X (SOCIOLOGY III) | w | 170 | 175 | 0 | | 0 | (SLANT LINE) | 0 |
| | | 555 | 700 | | | 1 | (TRIANGLE) | 0 |
| | | | | | | 1 | (ARROW) | |
| | | | | | | 1 | (UNDERLINE) | |
| | | | | | | 0 | (FREE-FORM CURVE) | |

FILLING INSIDE CIRCULAR FRAME

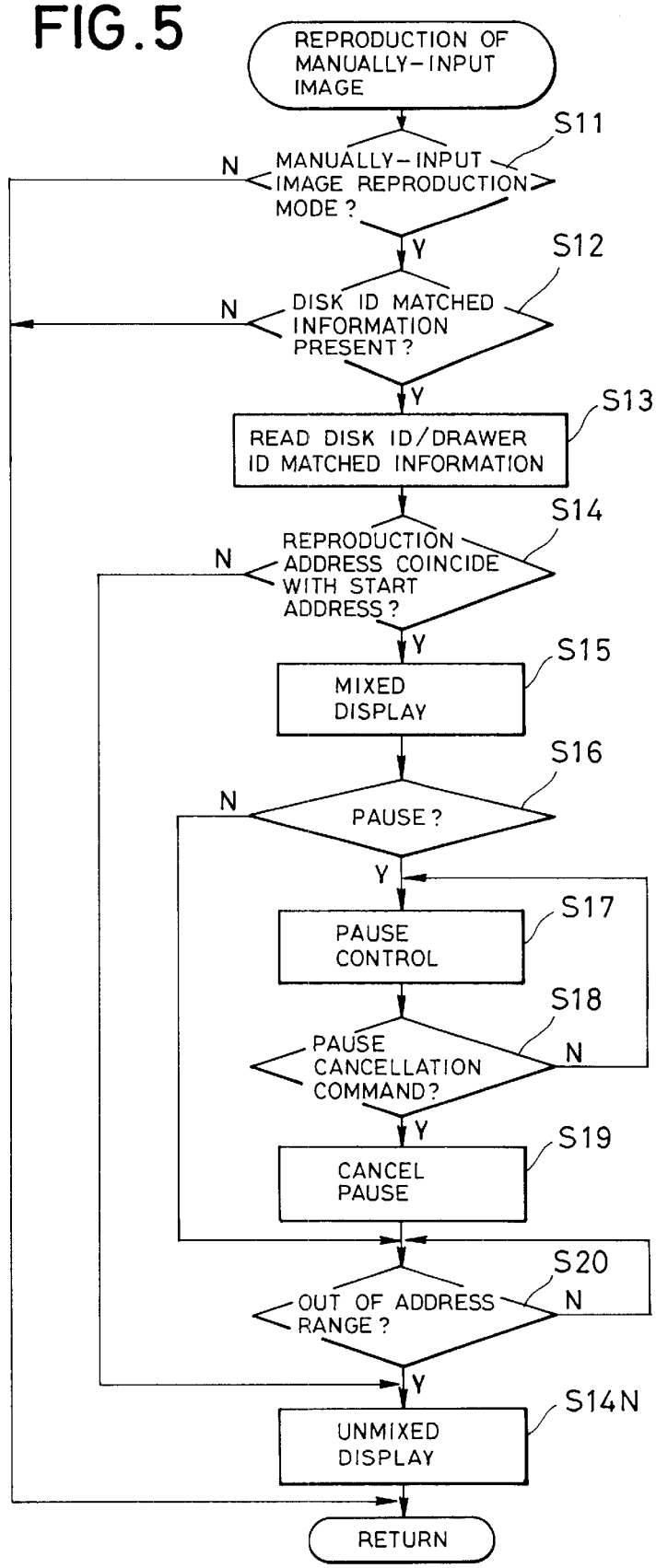

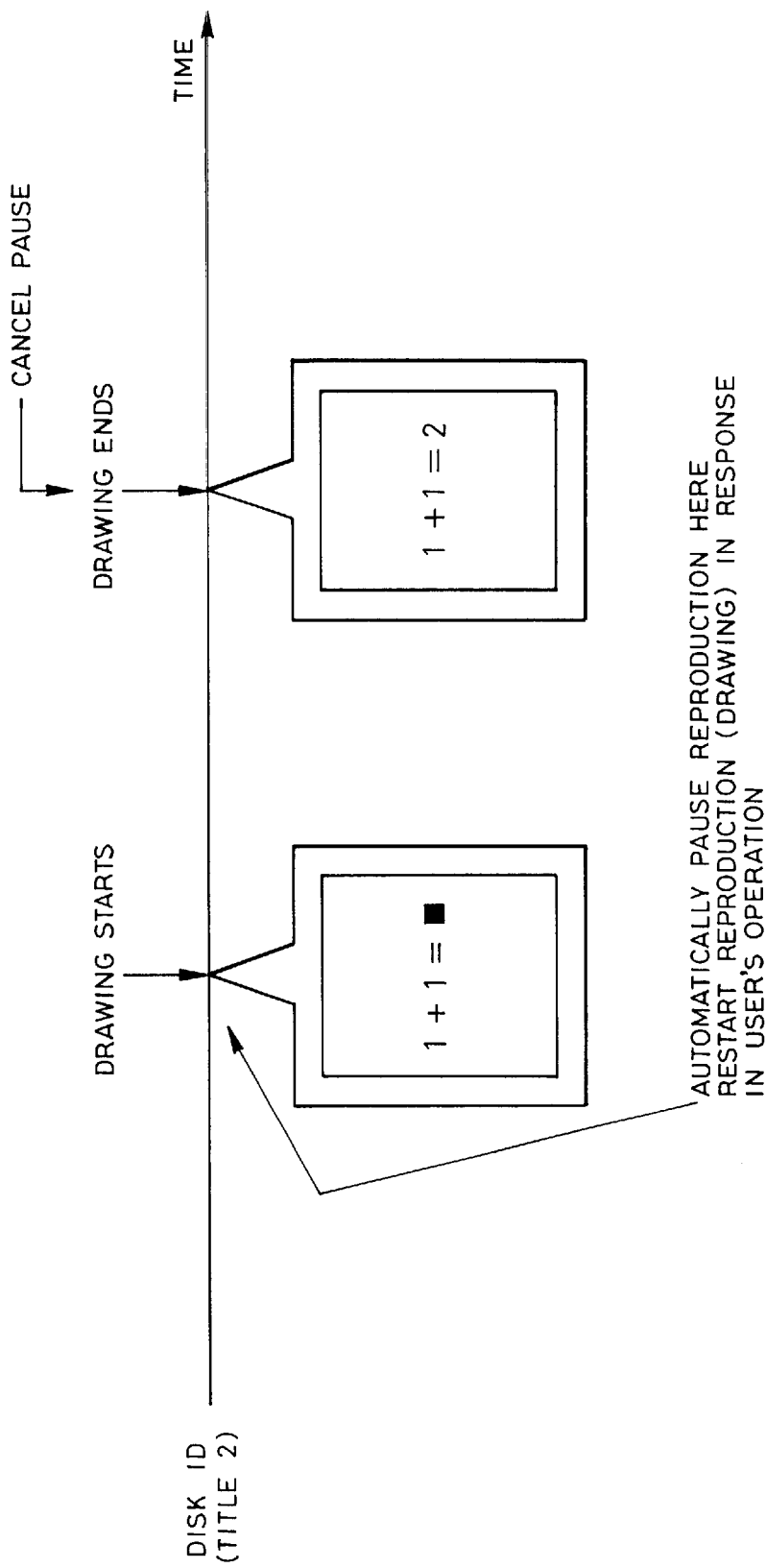

IMAGE INFORMATION REPRODUCING APPARATUS

BACKGROUND OF THE INVENTION

1. Field of the Invention

The present invention relates to an image information reproducing apparatus, and, more particularly, to an image information reproducing apparatus which reproduces image information based on a signal read from a recording medium.

2. Description of the Related Art

Recently, DVDs (Digital Video Disks) and systems which reproduce recorded information therefrom have become quite popular.

As a general-purpose disk type recording medium, a DVD has capacity to record the largest amount of information which we have not obtained until now, and attempts are being made to improve reading techniques which are adapted to the DVD. By using the DVD, a sufficient amount of information, such as image data, voice data and computer data, can be recorded and the recorded information can be reproduced certainly. Further, there is a possibility that DVDs will be extensively used in other technical fields different from the current technical fields.

So far, however, DVDs have often been used in a limited manner, such as reproduction of only recorded information, and it has been unsuccessful to make sufficient use of inherent merits of DVDs.

Although packaged media such as a DVD are popularized, they are not extensively utilized in various application fields.

SUMMARY OF THE INVENTION

Accordingly, it is an object of the present invention to provide an image information reproducing apparatus which can make good use of image information recording media and a scheme of reproducing recorded information from the recording media.

To achieve the above object, according to the present invention, there is provided an image information reproducing apparatus for reproducing image information based on a read signal acquired from an image information recording medium, which comprises original image generation means for reproducing a video signal carrying an original image from the read signal; manually-input image generation means for preparing a manually-input image to be superimposed on the original image in accordance with an operational input, thereby generating a manually-input image signal; mixing means for generating a mixed image signal carrying a mixed image having the manually-input image superimposed on the original image, based on the video signal and the manually-input image signal; and storage means for storing the manually-input image signal in association with address information in the recording medium of a video signal corresponding to the original image on which the manually-input image is superimposed.

The image information reproducing apparatus may further comprise control means for acquiring, as a reproduction address, the address information in the recording medium of the video signal generated by the original image generation means, and, when the reproduction address matches with the address information stored in the storage means, reading a manually-input image signal corresponding to the matched address from the storage means and supplying the read manually-input image signal to the mixing means.

The storage means may store the manually-input image signal in association with identification information of a recording medium carrying a video signal corresponding to the original image on which the manually-input image is superimposed, and when the identification information, stored in association with the manually-input image signal corresponding to the matched address, is equivalent to a recording medium which is a current reading target, the control means may supply the manually-input image signal to the mixing means.

The storage means may store the manually-input image signal further in association with creator identification information of the manually-input image, and when the creator identification information, stored in association with the manually-input image signal corresponding to the matched address, is equivalent to a creator which is a reproduction target, currently set by a user, the control means may supply the manually-input image signal to the mixing means.

For each manually-input image signal, the storage means may store display control information indicating whether or not a manually-input image of that manually-input image signal should automatically be superimposed on the original image, and when the display control information, stored in association with the manually-input image signal corresponding to the matched address, indicates superimposition of the manually-input image, the control means may supply the manually-input image signal to the mixing means.

For each manually-input image signal, the storage means may store selective superimposition control information indicating that a manually-input image of that manually-input image signal should be superimposed on the original image in accordance with a result of user selection, and when the selective superimposition control information, stored in association with the manually-input image signal corresponding to the matched address, is significant, the control means may supply the manually-input image signal to the mixing means in accordance with a result of user selection.

The storage means may store the manually-input image signal further in association with still image mode information indicating whether or not a reproduction mode of the video signal has been set to a still image reproduction mode immediately before generation of the mixed image signal in the mixing means, and when the still image mode information, stored in association with the manually-input image signal corresponding to the matched address, indicates the still image reproduction mode, the control means may control the reproduction mode of the video signal to be the still image reproduction mode.

For each predetermined group of manually-input image signals, the storage means may store group-by-group display control information indicating whether or not manually-input images of that group of manually-input image signals should be superimposed on the original image, and when the group-by-group display control information, stored in association with a predetermined group of manually-input image signals corresponding to the matched address, indicates superimposition of the manually-input images, the control means may supply the manually-input image signal to the mixing means.

Further, storage contents of the storage means can be changed in accordance with an operational input or can be displayed in response to an operational input.

BRIEF DESCRIPTION OF THE DRAWINGS

FIG. 3 is a time chart illustrating the state of acquisition of a manually-input image which is implemented by the image information reproducing apparatus in FIG. 1;

FIG. 4 is a diagram depicting a recording state of a manually-input image memory in the image information reproducing apparatus in FIG. 1;

FIG. 5 is a flowchart illustrating a manually-input image reproduction routine which is executed by the controller in the image information reproducing apparatus in FIG. 1; and FIG. 6 is a time chart illustrating the state of characteristic reproduction of a manually-input image which is performed by the image information reproducing apparatus in FIG. 1.

DETAILED DESCRIPTION OF THE PREFERRED EMBODIMENT

A preferred embodiment of the present invention will now be described in detail referring to the accompanying drawings.

Figure 1:
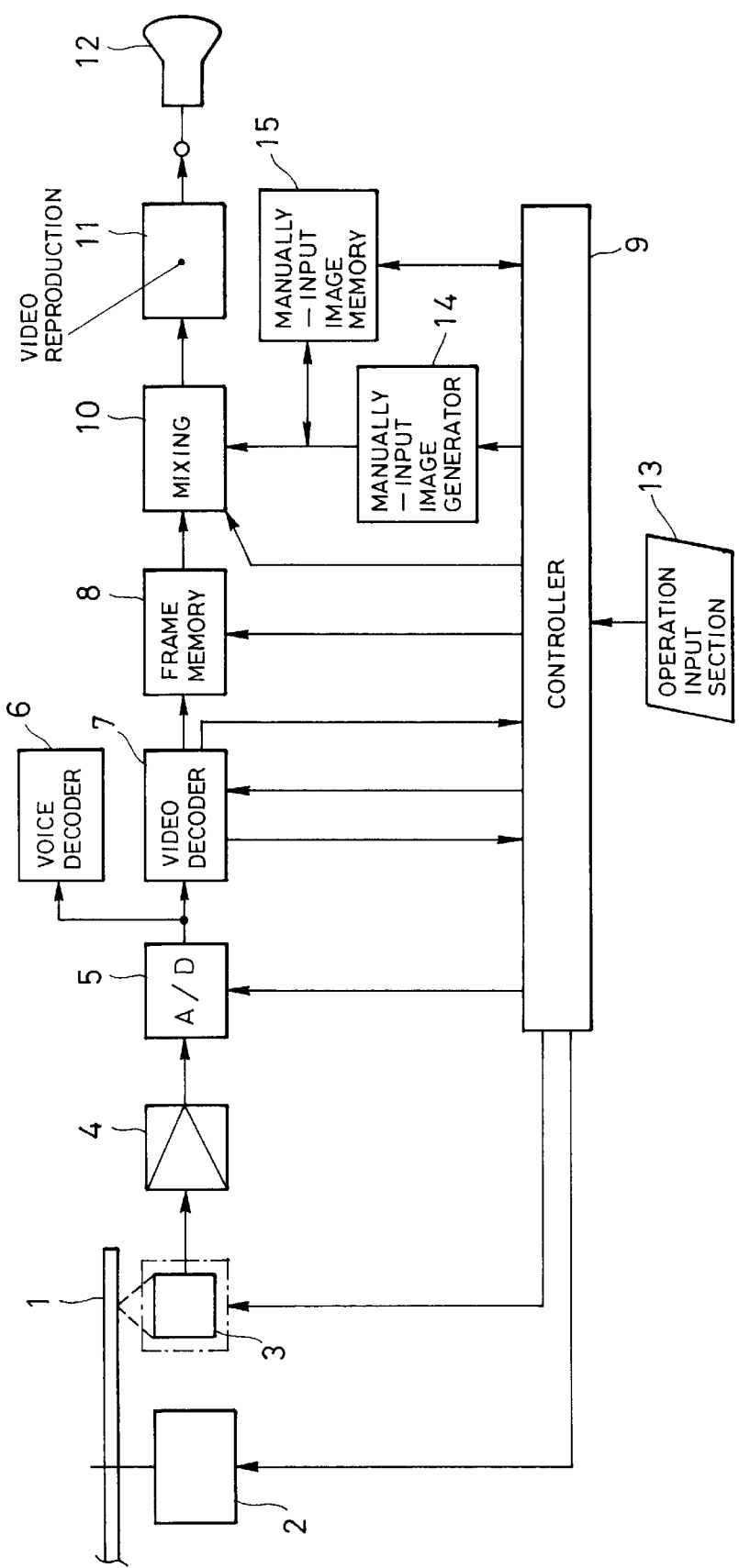
FIG. 1 is a block diagram showing the schematic constitution of an image information reproducing apparatus according to one embodiment of the present invention.

FIG. 1 shows the schematic constitution of an image information reproducing apparatus according to one embodiment of the present invention.

In FIG. 1, a pickup 3 irradiates a laser beam as reading light on a disk 1, which is a large capacity recording medium such as a DVD and to which a high quality information reproduction technology can be adapted, while the disk 1 is rotated by a spindle motor 2. The laser beam irradiated to the disk 1 reaches the information recording surface of the disk 1 and returns to the pickup 3 as reflected light with information recorded on the disk 1.

The pickup 3, which has a photoelectric converting circuit including a light-receiving element, receives the reflected light from the disk 1 and performs photoelectric conversion corresponding to the level and condition of the received light. The photoelectric conversion output is supplied to a reproduction amplifier 4 as a read signal.

The reproduction amplifier 4 amplifies the supplied read signal and sends the amplified read signal to an A/D (Analog/Digital) converter 5. The A/D converter 5 digitizes the input signal in synchronism with a sampling timing signal given from a controller 9. The read signal digitized by the A/D converter 5 is supplied to a voice decoder 6 and a video decoder 7.

The voice decoder 6 decodes the supplied read signal to reproduce a voice data signal, and transfers the voice data signal to a voice signal processing system (not shown).

The video decoder 7 performs processes, such as 8–16 demodulation, deinterleaving, error correction and MPEG decoding, on the read signal, thereby reproducing a video data signal, and transfers the video data signal to a frame memory 8. The video decoder 7 reproduces a sync signal from the read signal and sends the sync signal to the controller 9. On the basis of the sync signal, the controller 9 generates operation clocks for the processes that are carried out in the video decoder 7. The video decoder 7 acquires address information and disk identification (ID) information both included in the read signal, in addition to the video data signal, and sends those information to the controller 9.

In accordance with a write control signal and read control signal from the controller 9, the frame memory 8 writes at least one frame of transferred video data signals and sequentially reads and transfers the written video data signals to a mixing circuit 10.

The pickup 3, the reproduction amplifier 4, the A/D converter 5, the video decoder 7 and the frame memory 8 constitute original image generating means.

In accordance with a control signal from the controller 9, the mixing circuit 10 mixes the video data signal, transferred from the frame memory 8, with a manually-input image signal which will be described later, or outputs only the video data signal from the frame memory 8 or the manually-input image signal. The mixing of the video data signal with the manually-input image signal yields a mixed image signal which carries an image that puts a sub image carried on the manually-input image signal on a main image carried on the video data signal. A video reproducing circuit 11 converts the mixed image signal to an analog signal, for example, an analog composite video signal of the NTSC system, which is in turn supplied to a display device 12 such as a CRT and a liquid crystal display, from its output terminal.

The controller 9 has a function of sending a manually-input signal corresponding to the content of manual input operation done via an operation input section 13 by a user to a manually-input image generator 14. The manually-input image generator 14 generates an image signal indicated by the manually-input signal, and sends the image signal to the mixing circuit 10 as a manually-input image signal to be mixed with the output video data signal of the frame memory 8. The manually-input image signal is supplied to a manually-input image memory 15 as well as to the mixing circuit 10.

The manually-input image memory 15 is preferably a flash memory which can hold the storage content even after the reproducing apparatus is powered off. The manually-input image signal is written in the manually-input image memory 15 in association with various associated information based on a write control signal from the controller 9, and the manually-input image signal is also read from the memory 15 and supplied to the mixing circuit 10 based on a read control signal from the controller 9. The associated information corresponding to the manually-input image signal is sent to the controller 9.

The controller 9 implements control operations, such as tracking control to allow the reading light from the pickup 3 to follow recording tracks on the disk 1, slider control to move the pickup 3 in the radial direction of the main surface of the disk 1 and focus control to focus the reading light on the recording surface of the disk 1. Those controls are carried out based on the reflected light or read signal from the disk 1, though their details are not illustrated.

The controller 9 also performs rotational control to rotate the spindle motor 2. The control is likewise executed based on the reflected light or read signal from the disk 1, though its details are not illustrated.

Although FIG. 1 shows the controller 9 as a single block which controls all the other blocks for the sake of descriptive simplicity, the controller 9 may be illustrated as some adequate blocks which execute the necessary controls for the other individual blocks.

The operation of the above image information reproducing apparatus will now be discussed specifically.

Figure 2:
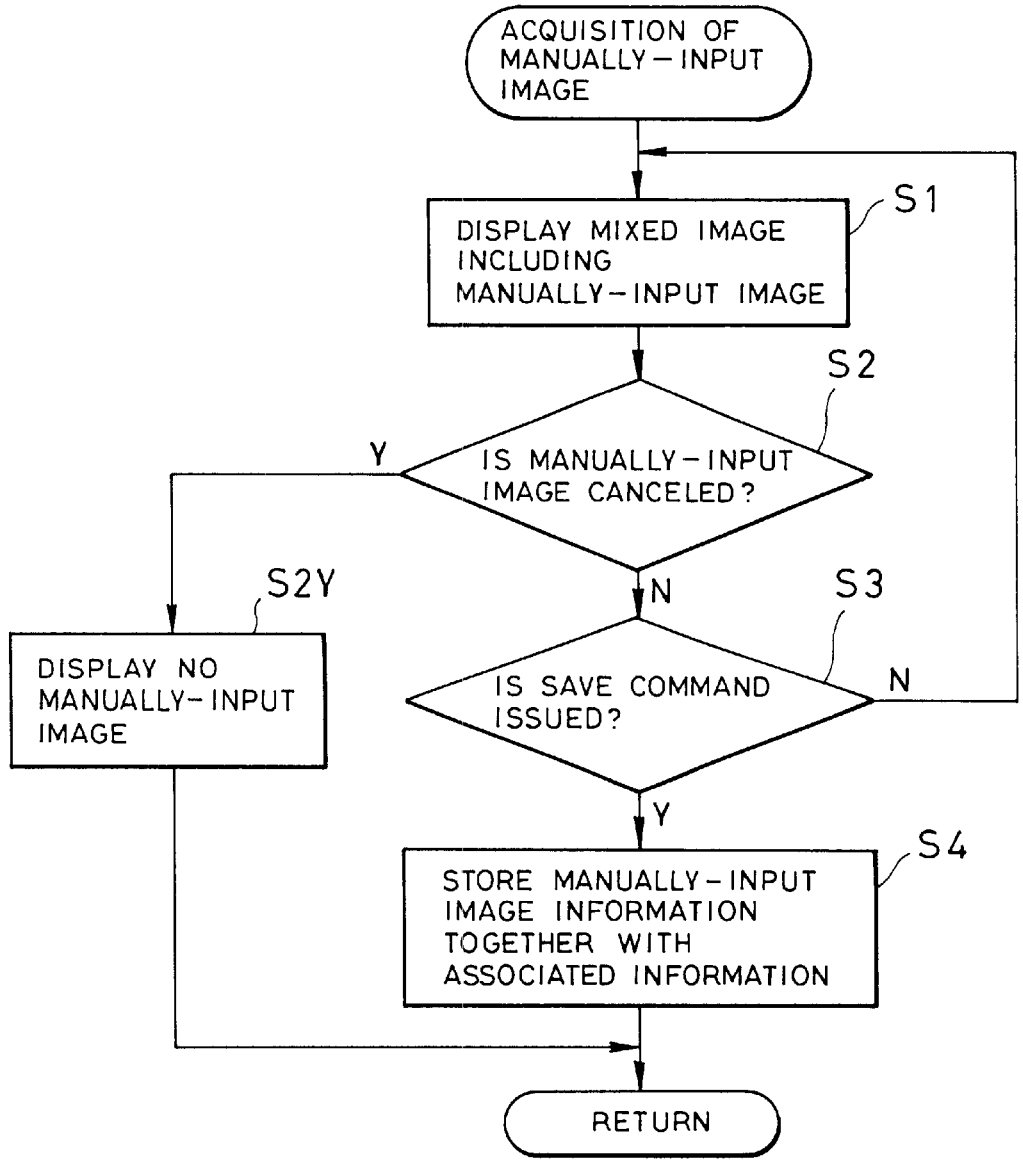
FIG. 2 is a flowchart illustrating a manually-input image acquisition routine which is executed by a controller in the image information reproducing apparatus in FIG. 1.

FIG. 2 illustrates a manually-input image acquisition process which is executed by the controller 9.

The following will discuss the case where the image information reproducing apparatus reproduces some still image based on a read signal from the disk 1 and displays the image on the display device 12.

Reproduction of a still image is accomplished by temporarily writing one frame of video data signals reproduced by the video decoder 7, which corresponds to the still image, in the frame memory 8, and causing the controller 9 to execute such control as to repeatedly read one frame of video data signals from the frame memory 8 in response to a still image reproduction instruction given from the operation input section 13 or given by information recorded on the disk 1. The one frame of video data signals is supplied to the video reproducing circuit 11 via the mixing circuit 10, and a still image corresponding to the one frame of video data signals is displayed on the display device 12. In the still image reproduction mode, the reading status of the disk 1 is kept at a pause status where the reading light from the pickup 3 repeatedly scans the same recording track on the disk 1.

A user inputs an image (manually-input image) to be overwritten on the still image using the operation input section 13 while seeing the still image.

As shown in FIG. 3, for example, while an original still image SO is displayed based only on an output of the video decoder 7, a manually-input image such as a straight line, a free-form curve, a rectangle and an ellipsoid can be superimposed on the original still image S0, yielding a new still image S01.

As the operation input section 13 for preparing the manually-input image, a mouse which is used as input means for a general-purpose computer is suitable, but a keyboard or a remote control unit may be used regardless of whether or not it is used together with the mouse. The keyboard is effective for many users as plain character input means, while the remote control unit is advantageous in not restricting the operational pose of a user.

When the user makes an overwriting input operation such as adding a desired image on the original still image S0 using the operation input section 13, the controller 9 executes a subroutine illustrated in FIG. 2. The controller 9 controls the mixing circuit 10 and the manually-input image generator 14 in such a manner that the mixed image S01 is displayed on the display device 12 in accordance with the overwriting input operation(step S1). The mixed image S01 is obtained from the superimposition of the manually-input image on the original image S0 indicated in the video data signal from the frame memory 8.

Next, the controller 9 determines if a manually-input image display cancellation command has been issued from the operation input section 13 (step S2). When the manually-input image display cancellation command has been issued, the controller 9 controls the mixing circuit 10 and the manually-input image generator 14 in such a way as to stop displaying the manually-input image and display only the original image S0 (step S2Y), and terminates the subroutine and returns to the main routine.

When the manually-input image display cancellation command has not been issued in step S2, the controller 9 determines if a save command to save the mixed still image S01 formed in step S1 and its associated information has been issued (step S3). The save command is generated through the operation input section 13 by the user. When the save command has not been issued, the controller 9 goes to step S1 and keeps displaying the mixed still image S01.

When the save command has been issued in step S3, the controller 9 performs a process of saving manually-input image information in the mixed still image S01 formed in step S1, and associated information of the mixed still image S01 (step S4).

In the process, which will be discussed more specifically below, various kinds of information are stored with corresponding relation in the manually-input image memory 15, as illustrated in FIG. 4.

The controller 9 writes manually-input image information in the manually-input image memory 15 in association with the identification information (ID) of the disk 1, a drawer ID for identifying a person (drawer) who has drawn the manually-input image, individual addresses indicating the record start position (start point) and record end position (end point) of the original still image S0 of the mixed still image S01 on the disk 1, and associated information like pause information which indicates if a pause command has been issued directly before drawing of the manually-input image. The pause information is still image mode information, and indicates whether or not the still image reproduction mode has been set by using the frame memory 8 immediately before the mixing circuit 10 has generated a mixed image signal.

The disk ID and the start and end addresses of the mixed still image S01 are acquired from the video decoder 7. It can be said that the disk ID is for identifying so-called software information recorded on a disk and distinguishes, for example, learning software for one subject from learning software for another subject. It is easy that the start and end addresses correspond to frames of video signals.

The drawer ID is given at the time of drawing a manually-input image or in a modification process after the drawing. The pause information is basically obtained as the controller 9 reads from its internal memory information which indicates if there is a pause command immediately before the drawing of the manually-input image and which has been temporarily stored in the internal memory, but it can be modified in a later modification process.

Manually-input image information is classified into different groups based on the associated information, and is given priority as to which group of manually-input images is to be displayed in a manually-input image reproduction routine which will be discussed later. In this example, as shown in FIG. 4, the manually-input image information is grouped for each drawer ID, and a logic value of "1" is stored in association with the group of manually-input image information which is selected in the manually-input image reproduction routine as the one that should be displayed at the highest priority, while a logic value of "0" is stored as display control main information (group-by-group display control information) in association with the other groups.

The manually-input image memory 15 also stores display control sub-information as the mentioned associated information for each manually-input image information. A logic value of "1" is assigned to the display control sub-information to specify automatic superimposition on an original image in the manually-input image reproduction routine, and a logic value of "0" is assigned to the display control sub-information to specify that superimposition on an original image is to be implemented in the manually-input image reproduction routine only when designated so by a user.

After storing information necessary for the mixed still image S01 in the manually-input image memory 15, the controller 9 terminates the subroutine and returns to the main routine.

The associated information stored in the manually-input image memory 15 can be displayed on the display device 12 for user confirmation. The display is accomplished as the controller 9 performs read control on the manually-input image memory 15 and controls the mixing circuit 10 in such a way that information read from the manually-input image memory 15, not information acquired from the video data signal from the frame memory 8, is displayed. At this time, the associated information can be displayed as a list in a text form if it is sent to the display device 12 via a character generator.

A user can alter individual information while viewing the displayed information, or can display other information than the displayed one using the operation input section 13.

When the user designates a group to be displayed using the operation input section 13, the controller 9 performs such control as to read information of the designated group in the manually-input image memory 15. Consequently, the display device 12 displays the associated information of the manually-input image information of the designated group in, for example, the address order. With the associated information displayed in the manner, when the user selects one associated information and makes an input to change the content of the selected information by using the operation input section 13, the controller 9 sends the changed information to the manually-input image memory 15 to rewrite the contents of the memory 15.

The manually-input image reproduction subroutine will now be described.

FIG. 5 illustrates procedures of the reproduction subroutine. When the reproduction subroutine is called from the main routine not shown at a given timing, the controller 9 first determines if the mode for reproducing a manually-input image is set (step S11). When the reproduction mode is not set, the controller 9 terminates the subroutine and returns to the main routine.

When the reproduction mode is set, the controller 9 acquires the ID of the disk 1, currently loaded, from the output data of the video decoder 7, and determines if information of a disk ID which matches with the disk ID is stored in the manually-input image memory 15 (step S12). When there is no such matched disk ID information, the controller 9 terminates the subroutine and returns to the main routine.

When there is the matched disk ID information found in step S12, the controller 9 reads from the manually-input image memory 15 associated information which corresponds to the currently set drawer ID from among the associated information corresponding to the disk ID, and stores the information in the internal memory (step S13).

Then, the controller 9 determines if the address on the disk 1 (hereinafter called "reproduction address") which corresponds to the video data signal of the image that is currently being reproduced coincides with any start address stored in the internal memory (step S14). When the controller 9 determines that there is no match between both addresses, the controller 9 moves to unmixed display step S14N to display the image based only on the video data signal from the frame memory 8, and then terminates the subroutine.

When the controller 9 determines in step S14 that both addresses match with each other, the controller 9 goes to mixed display step S15. In the mixed display step S15, the controller 9 implements such control as to read manually-input image information corresponding to the matched address from the manually-input image memory 15, cause the mixing circuit 10 to mix the video data signal from the frame memory 8 with the signal of the read manually-input image information and supply a mixed image signal, which carries the mixed image of the original image and the manually-input image, to the display device 12.

After the mixed display, the controller 9 checks pause information of the manually-input image information corresponding to the matched address (step S16). Each manually-input image information, as apparent from the aforementioned FIG. 4, is associated with pause information which indicates whether or not pause has been carried out and the still image reproduction mode has been set immediately before drawing the manually-input image information, and the controller 9 determines the pause information based on the storage contents of the memory 15.

When the pause information specifies pausing, the controller 9 implements rotational control on the disk 1, scan control on the pickup 3 and write/read control on the frame memory 8 to set the pause mode (step S17).

After the pause mode is set, the controller 9 determines if a pause cancellation command to cancel the pause mode has been issued through the operation input section 13 (step S18). When the pause cancellation command has not been issued yet, the controller 9 moves to step S17 to keep the pause mode. When the pause cancellation command has been issued, on the other hand, the controller 9 implements rotational control on the disk 1, scan control on the pickup 3 and write/read control on the frame memory 8 to set the mode back to the normal reproduction mode (step S19).

When the pause information indicates no pausing in step S16 or after the pause cancellation process in step S19 has been completed, the controller 9 determines if the reproduction address is off the address range (from the start address to the end address) which corresponds to the manually-input image that has been used in the mixed display in step S15 (step S20).

When having determined that the reproduction address is not off the address range, the controller 9 repeats step S20 to keep the mixed display in step S15. When having determined that the reproduction address is off the address range, the controller 9 goes to unmixed display step S14N to display the image based only on the video data signal from the frame memory 8, and then terminates the subroutine.

The process from step S16 to step S19 can accomplish image reproduction as shown in FIG. 6.

When a manually-input image which fills inside a rectangular frame to hide the answer portion "2" of an original image of "1+1=2" is superimposed on the original image, first, pause is applied at the address of the manually-input image to carry out still reproduction of the original image, pause is canceled only when instructed by the user, the reproduction address is incremented, and the answer "2" can be displayed when the reproduction address comes off the manually-input image address.

Because the display control sub-information is stored for each manually-input image information as has been explained earlier with reference to FIG. 4, the display control sub-information is checked and the associated manually-input image is superimposed on the original image and the mixed image is then displayed in step S15 when the display control sub information instructs automatic drawing. When the display control sub information instructs selective drawing, on the other hand, the associated manually-input image is or is not superimposed on the original image according to display/non-display information which is set in a separate subroutine. The separate subroutine is called by an instruction input from the operation input section 13 by the user, and arbitrarily determines whether or not to superimpose the manually-input image whose selective drawing is indicated on the original image.

According to the above-described embodiment, a user can freely superimpose and add a desired image on original image information recorded on the disk 1 and can save the added information (manually-input image). The saved manually-input image can be superimposed on associated original image information to restore the original image and the mixed image can be displayed, at the time of reproducing image information again from the disk 1. The feature is considerably suitable for usage such as giving supplemental explanation, marking important parts or hiding answers for questions for learning software or the like. The above-described functions of the embodiment can of course be used in various sorts of applications including learning software.

Although the foregoing description of the embodiment has been given with reference to the case where a manually-input image is superimposed on a still image to restore the original image, the embodiment can be adapted to moving images as well as still images.

Although a DVD has been explained as a recording medium in the foregoing description of the embodiment, the invention can be adapted to other image recording media including a CD (Compact Disk).

Although various means were described in the foregoing description of the embodiment in a restrictive manner, such means may be adequately modified within the scope that can be designed by those skilled in the art.

As described specifically above, the image information reproducing apparatus of the invention can make good use of image information recording media and a scheme of reproducing recorded information from the recording media, and can widen the application fields of such recording media.

What is claimed is:

1. An image information reproducing apparatus for reproducing image information based on a read signal acquired from an image information recording medium, comprising:

original image generation means for reproducing a video signal carrying an original image from said read signal;

manually-input image generation means for preparing a manually-input image to be superimposed on said original image in accordance with an operational input, thereby generating a manually-input image signal;

mixing means for generating a mixed image signal carrying a mixed image having said manually-input image superimposed on said original image, based on said video signal and said manually-input image signal;

storage means for storing said manually-input image signal in association with address information in said recording medium of said video signal corresponding to said original image on which said manually-input image is superimposed; and control means for acquiring, as a reproduction address, said address information in said recording medium of said video signal generated by said original image generation means, and, when said reproduction address matches with said address information stored in said storage means, reading a manually-input image signal corresponding to said matched address from said storage means and supplying said read manually-input image signal to said mixing means.

2. The image information reproducing apparatus according to claim 1, wherein said storage means stores said manually-input image signal in association with identification information of a recording medium carrying a video signal corresponding to said original image on which said manually-input image is superimposed.

3. The image information reproducing apparatus according to claim 2, wherein when said identification information, stored in association with said manually-input image signal corresponding to said matched address, is equivalent to a recording medium which is a current reading target, said control means supplies said manually-input image signal to said mixing means.

4. The image information reproducing apparatus according to claim 1, wherein said storage means stores said manually-input image signal further in association with creator identification information of said manually-input image.

5. The image information reproducing apparatus according to claim 4, wherein when said creator identification information, stored in association with said manually-input image signal corresponding to said matched address, is equivalent to a creator which is a reproduction target, currently set by a user, said control means supplies said manually-input image signal to said mixing means.

6. The image information reproducing apparatus according to claim 1, wherein for each manually-input image signal, said storage means stores display control information indicating whether or not a manually-input image of that manually-input image signal should automatically be superimposed on said original image.

7. The image information reproducing apparatus according to claim 6, wherein when said display control information, stored in association with said manually-input image signal corresponding to said matched address, indicates superimposition of said manually-input image, said control means supplies said manually-input image signal to said mixing means.

8. The image information reproducing apparatus according to claim 1, wherein for each manually-input image signal, said storage means stores selective superimposition control information indicating that a manually-input image of that manually-input image signal should be superimposed on said original image in accordance with a result of user selection.

9. The image information reproducing apparatus according to claim 8, wherein when said selective superimposition control information, stored in association with said manually-input image signal corresponding to said matched address, is significant, said control means supplies said manually-input image signal to said mixing means in accordance with a result of user selection.

10. The image information reproducing apparatus according to claim 1, wherein said storage means stores said manually-input image signal further in association with still image mode information indicating whether or not a reproduction mode of said video signal has been set to a still image reproduction mode immediately before generation of said mixed image signal in said mixing means.

11. The image information reproducing apparatus according to claim 10, wherein when said still image mode information, stored in association with said manually-input image signal corresponding to said matched address, indicates said still image reproduction mode, said control means controls said reproduction mode of said video signal to be said still image reproduction mode.

12. The image information reproducing apparatus according to claim 1, wherein for each predetermined group of manually-input image signals, said storage means stores group-by-group display control information indicating whether or not manually-input images of that group of manually-input image signals should be superimposed on said original image.

13. The image information reproducing apparatus according to claim 12, wherein when said group-by-group display control information, stored in association with a predetermined group of manually-input image signals corresponding to said matched address, indicates superimposition of said manually-input images, said control means supplies said manually-input image signal to said mixing means.

14. The image information reproducing apparatus according to claim 1, wherein storage contents of said storage means can be changed in accordance with an operational input.

15. The image information reproducing apparatus according to claim 1, wherein storage contents of said storage means can be displayed in response to an operational input.

* * * * *